March 14, 1967 C. O. SMITH, JR 3,308,978
HAND TRUCK UNLOADING APPARATUS
Filed March 9, 1965
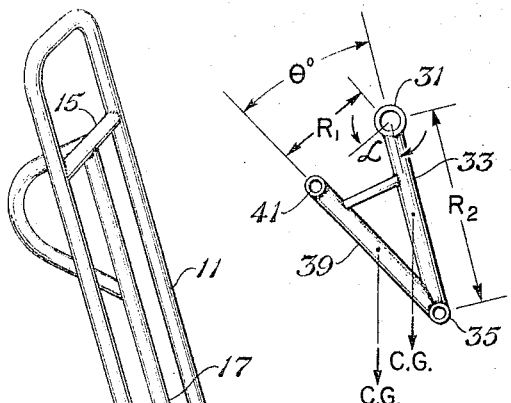
Fig.1
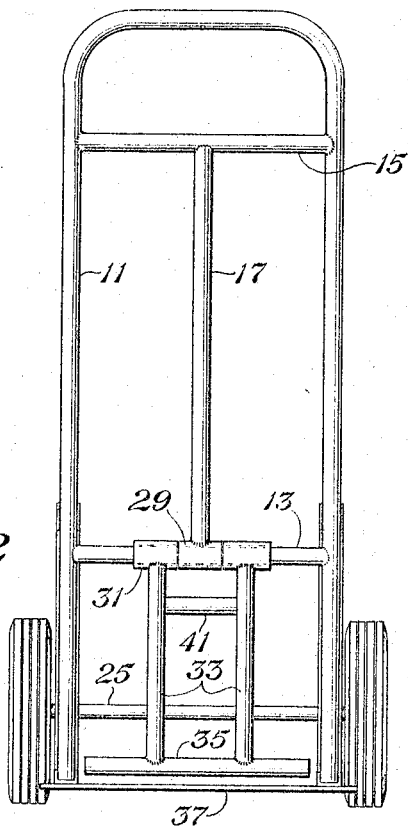
Fig.5
Fig.2
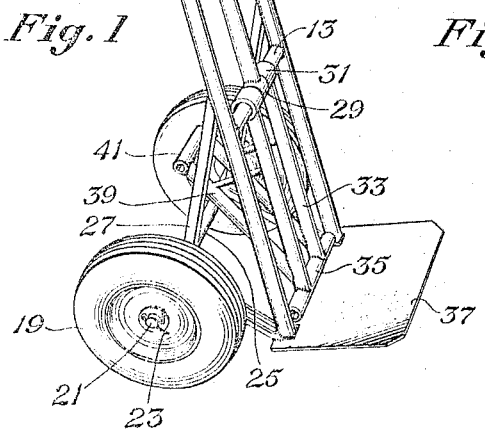
Fig.3
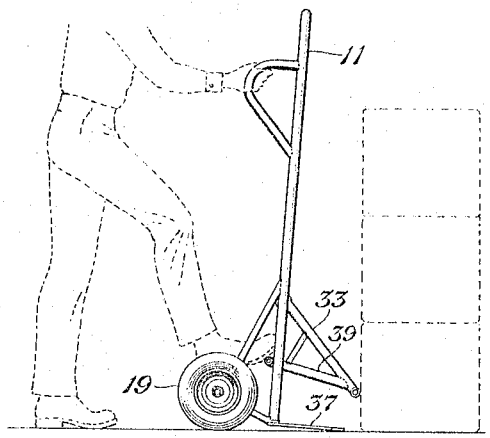
Fig.4
INVENTOR.
Connie O. Smith, Jr.
BY Robert A. Freeman
Attorney

United States Patent Office 3,308,978
Patented Mar. 14, 1967

3,308,978
HAND TRUCK UNLOADING APPARATUS
Connie O. Smith, Jr., 1220 Delmont,
Richardson, Tex. 75080
Filed Mar. 9, 1965, Ser. No. 438,348
4 Claims. (Cl. 214—511)

My invention relates in general to two-wheel, hand operated trucks, and to means for unloading the cargo from such trucks in particular.

Two-wheel, hand operated trucks have a cargo platform at the lower end portion thereof and the loading and unloading of cargo therefrom is often strenuous. It is particularly strenuous and time-consuming during unloading if the cargo is heavy. Normally, the user tries to tilt the cargo forward with one hand and then retract the truck with the other hand. This operation can be surprisingly difficult.

Previously, foot operated cargo unloading or "kickoff" devices have been developed. These devices are secured to the lower end of the trucks and, as the name indicates, are used to unload cargo from the trucks. Such devices had, however, a number of disadvantages, and as a result were not widely received.

It is the general object of my invention to provide an improved hand truck "kickoff" apparatus that eliminates many of the disadvantages of prior art devices.

Another object of my invention is to provide a "kickoff" apparatus for hand trucks wherein the distance traveled by the foot during cargo unloading is decreased to enable more convenient use of the apparatus.

Another object of my invention is to provide an improved "kickoff" apparatus for hand trucks wherein the apparatus, due to its construction, is returned to an out-of-the-way position in a simplified and reliable manner.

Another object of my invention is to provide simplified and economical means for attaching a "kickoff" apparatus to the frame of a hand truck, such means limiting lateral slippage of the apparatus with respect to the frame.

These and other objects are effected by my invention as it will be apparent from the following description taken in accordance with the accompanying drawing, forming a part of this application, in which:

FIG. 1 is a perspective view of a two-wheel, hand operated truck having a "kickoff" apparatus constructed and secured thereto in accordance with the the principles of my invention;

FIG. 2 is a front elevational view of the two-wheel, hand operated truck and "kickoff" apparatus of FIG. 1;

FIG. 3 is a fragmentary, partially sectioned view, which illustrates a preferred means of attaching the "kickoff" apparatus to the truck;

FIG. 4 is a side elevational view, with a user and cargo shown in phantom to demonstrate the manner of using the invention; and FIG. 5 is a schematic side elevational view of the "kickoff" apparatus of FIG. 1.

Referring now to the drawing, the numeral 11 designates the frame of a hand truck, and such frames are elongated and generally rectangular as shown. The frame includes at least one cross bar 13, which is horizontally disposed within the rectangular frame 11. To add strength to the frame, a second cross bar 15 is normally added in the upper region of the frame and a truss 17 normally spans the cross bars 13, 15.

Disposed toward the lower end of the truck are a pair of wheels 19. These wheels are mounted to an axle 21, being retained thereon by cotter keys 23 or other suitable means. An axle housing 25 surrounds axle 21 and is held in position by support structure 27 that preferably extends from the lower end of the frame toward the upper end thereof, as may be seen in FIG. 1.

As shown in FIGS. 2 and 3, the truss 17 is secured to spacer means 29, which in this instance is a cylindrical tube that mates with the cylindrical outer surface of cross bar 13. On each side of spacer means 29 is a collar 31. These collars 31 rotatably engage cross bar 13 and confront the ends of spaced means 29, being held in fixed relation to spaced means 29 as subsequently described.

Extending downwardly from collars 31 is a first set or pair of parallel leg means 33. These legs are secured to a cargo engaging member 35 that is in close proximity with a cargo platform 37, as may be seen in FIGS. 1 and 2. The cargo engaging member 35 is preferably tubular as shown, so that its rounded surface will not damage the cargo upon subsequent engagement. The parallel legs 33 and cargo engaging member 35 hold collars 31 in confronting relationship with the ends of spacer means 29.

A second set or pair of parallel legs 39 (see especially FIGS. 4 and 5) is supported by the first set of legs 33. This set of legs 39 can be secured to the first set of legs 33 or to the cargo engaging member 35, but in either instance, are "supported by" the first set of legs. These legs extend away from the cargo platform 37 and rearwardly of the frame 11 (the front of the frame is considered to be that portion which faces the cargo). As shown especially in FIG. 5, the first set of legs 33 and the second set of legs 39 reside at an angle $\theta$ with respect to each other as seen in a side elevational view. This angle should be not greater than 45 degrees, and preferably is selected from a range varying from 25 through 35 degrees, for a reason to be hereinafter explained. The second set of legs has a foot carriage member 41, which together with the second set of legs 39 constitutes a foot carriage means. The length of the second set of legs 39 is selected from a range that varies from 60 through 120 percent of the length of the first set of legs. Preferably, the second set of legs are from 70 through 100 percent of the length of the first set of legs.

When constructed as indicated above, my "kickoff" apparatus will return to the "out-of-the-way" position without need for springs or additional retraction means. The smaller the angle $\theta$, the closer the center of gravity of the "kickoff" apparatus is to frame 11 of the truck. This may be seen with reference to FIG. 5, where the center of gravity (C.G.) of the first set of legs 33, the collars 31, and the cargo engaging member 35 is shown as being in the center of legs 33. Similarly, the center of gravity (C.G.) of the second set of legs 39, the foot carriage member 41 and the cargo engaging member 35 is shown as being in the center of the second set of legs 39. If angle $\theta$ were zero degrees, the centers of gravity of the first and second set of legs 33, 39 would be coincident and as a result, the "kickoff" apparatus would hang in the vertical position. As angle $\theta$ increases, the center of gravity of the "kickoff" apparatus shifts rearwardly with respect to frame 11, and the apparatus hangs obliquely, with the cargo engaging element 35 moved forward.

Considering the preferred retracted position of the "kickoff" apparatus, it is advantageous to keep angle $\theta$ as small as possible. There is, however, another consideration, which is the need for enough distance between the foot carriage member 41 and the first set of legs 33 so that the foot of the user will have enough room to effectively engage the foot carriage 41. Consequently, angle $\theta$ must be much greater than zero degrees and preferably, is in a range varying from 25 to 35 degrees. Assuming that the second set of legs is approximately ten inches, and that angle θ is 25 degrees, the perpendicular distance from foot carriage member 41 to the first set of legs 33 is slightly greater than four inches. This distance permits enough of the foot to be placed on carriage 41 to allow application of an effective amount of downward force. Smaller distances are likely to cause the foot to slip from carriage 41. Increasing angle θ causes the "kickoff" apparatus to shift forward with respect to the frame 11 of the truck, but I have discovered that the angle θ may be increased to as great as 45 degrees and yet the apparatus will return to a sufficiently out-of-the-way position. The cargo engaging member 35 should not extend over about ⅓ to ½ of the fore-to-aft width of the cargo platform 37. Experience shows that any greater extension interferes too greatly with cargo loading. But with angle θ limited to not greater than 45 degrees and with the length of the second set of legs 39 decreased within the acceptable limits, the cargo engaging member 35 can be prevented from extending too far over platform 37.

The relative lengths of the first set of legs and the second set of legs 33, 39 is another important consideration. With respect to retractability, it is desirable that the second set of legs 39 be very short when compared to the length of the first set of legs 33. This would move the center of gravity of the two sets of legs closer together so that the "kickoff" apparatus would occupy a more nearly vertical position.

Unfortunately, this is not practicable since the perpendicular distance from foot carriage member 41 to the first set of legs 33 must not be too small, as is explained above. For the average person, the foot travel when using the "kickoff" apparatus should not be over about seven to ten inches. This means that the total distance traveled by the foot, after being placed on the foot carriage 41, and until the cargo is pushed forward and off of cargo platform 37, should not exceed this amount. If the distance traveled by the foot is any greater than this, it becomes too difficult and strenuous to apply downward force.

Assume, for example, the case where the angle θ is made 45 degrees and where the length of the first set of legs is ten inches. Further assumed that the "kickoff" apparatus as seen in side elevational view (FIG. 5) is a right triangle so that angle α is also 45 degrees. Thus, the distance $R_1$ from centerline of collars 31 to the centerline of foot carriage 41 would be about seven inches. (This means that the length of the second set of legs 39 is 70 percent of the length of the first set of legs 33.) Therefore, when the apparatus is rotated by the foot, the distance traveled in the forward direction by the cargo and the horizontal distance traveled by the foot (actually the foot travels in an arc) are proportional to the ratios of the lengths $R_2$ to $R_1$ or about ten to seven. As a consequence, when the cargo travels ten inches, the foot travels only about seven inches. It is preferable that the foot travel be decreased in many instances, and therefore the angle θ is generally selected from a range varying from 25 through 35 degrees. When angle θ is 35 degrees, the distance $R_1$ (see FIG. 5) is 5.7 inches, and the length of the second set of legs 39 is 8.2 inches (assuming the legs form a right triangle). Therefore, if the cargo travels forward a distance of ten inches, the foot travels horizontally a distance of only 5.7 inches.

From the above description it may be seen that if the length of the second set of legs is too short, the distance $R_1$ becomes too great, and foot travel is lengthened. Thus, when considering foot travel, the second set of legs 39 should not be less than 60 percent of the length of the first set of legs 33. In addition, the second set of legs cannot be too long, for the center of gravity moves rearwardly with respect to frame 11 as the length of the second set of legs increases. When angle θ is 45 degrees, the length of the second set of legs 39 should not be greater than 125 percent of the length of the first set of legs (the first set of legs are usually from ten to twelve inches long). Otherwise, the cargo engaging member 35 will move across cargo platform 37 too far. If angle θ is selected to be not greater than 45 degrees and if the second set of legs is selected from a range varying from 60 to 125 percent of the length of the first set of legs, then the apparatus can be used with effectiveness and convenience.

In operation, the foot is placed on the foot carriage member 41 and the frame of the apparatus grasped by the hand, as indicated in FIG. 4. Then downward pressure is applied by the foot, causing the "kickoff" apparatus to rotate forward until the cargo engaging member 35 forcefully engages the cargo. As more force is applied, the cargo is pushed off the cargo platform (as in the case of light loads), or the hand truck is pushed rearwardly with respect to the cargo (as in the case of heavy loads).

When the "kickoff" apparatus is constructed in accordance with the principles of my invention as described above, the foot travel is optimized to permit the application of large amounts of force with decreased effort. Also, there is sufficient room for comfortable placement of the foot on the foot carriage 41 of the apparatus, and the apparatus returns to the out-of-the-way position in a simplified manner, without need for spring biased means or other mechanical apparatus. Moreover, the construction of the apparatus to include spacer means 29 and collars 31 on a cross bar 13, with the spacer means and collars being held in confronting relation by parallel legs 33 and a cargo engaging member 37 leads to significant advantages. This produces an especially strong apparatus that is prevented from slipping laterally with respect to the truck frame 11. The resulting light weight construction makes the apparatus and truck easy to handle.

While I have shown my invention in only one form, it should be apparent to those skilled in the art that it is not so limited, but is susceptible of various changes and modifications without departing from the spirit thereof.

I claim:

1. In a hand truck of the type having an elongated frame, two wheels, and a cargo platform secured to one end portion of the frame, the improvement comprising:
   (a) a horizontal cross bar connected to said elongated frame;
   (b) a pair of collars rotatably connected to said cross bar;
   (c) spacer means selectively positioned and secured intermediate said collars;
   (d) a first set of substantially parallel legs, each having one end thereof connected to a respective collar;
   (e) a cargo engaging member secured to the opposite ends of said legs;
   (f) a second set of substantially parallel legs having end portions secured to one of said cargo engaging member and the lower portions of said first set of legs, and extending away from said cargo and rearwardly of said frame, with the included angle between said first and second sets of parallel legs being not greater than 45 degrees and with said second set of legs being of a length selected from a range that varies from 60 through 125 percent of the length of said first set of legs; and
   (g) a foot carriage secured to the opposite end portions of said second set of parallel legs.

2. The invention as defined by claim 1, wherein the included angle between said first and second sets of legs is selected from a range varying from 25 through 35 degrees and wherein the length of said second set of legs is selected from a range that varies from 70 through 100 percent of the length of said first set of legs.

3. In a hand truck of the type having an elongated frame, two wheels, and a cargo platform secured to one end portion of the frame, the improvement being a "kickoff" apparatus that comprises:
   (a) a first leg pivotally connected to said frame for movement in a vertical plane;

(b) a cargo engaging element secured to the lower end of said leg;

(c) a second leg having one end portion secured to one of said cargo engaging element and the lower end of said first leg, the included angle between said legs being not greater than 45 degrees, and the length of said second leg being selected from a range that varies from 60 through 125 percent of the length of said first leg; and (d) a foot carriage means secured to the opposite end portion of said second leg.

4. The invention as defined by claim 3, wherein the included angle between said first and second sets of legs is selected from a range varying from 25 through 35 degrees and wherein the length of said second set of legs is selected from a range that varies from 70 through 100 percent of the length of said first set of legs.

References Cited by the Examiner

UNITED STATES PATENTS

| | | | |
|---|---|---|---|
| 1,462,233 | 7/1923 | Kerr | 214—511 |
| 1,542,023 | 6/1925 | Alexander | 214—511 |
| 2,406,158 | 8/1946 | Newport | 214—511 |
| 2,649,219 | 8/1953 | Nielsen | 214—511 |

GERALD M. FORLENZA, *Primary Examiner.*

ALBERT J. MAKAY, *Examiner.*